US009341850B1

(12) United States Patent
Cakmakci et al.

(10) Patent No.: US 9,341,850 B1
(45) Date of Patent: May 17, 2016

(54) DIFFRACTIVE SEE-THROUGH DISPLAY WITH HYBRID-OPTICAL ABERRATION COMPENSATION

(71) Applicant: Google Inc., Mountain View, CA (US)

(72) Inventors: Ozan Cakmakci, Sunnyvale, CA (US); Anurag Gupta, Los Gatos, CA (US); Bernard C. Kress, Redwood City, CA (US)

(73) Assignee: Google Inc., Mountain View, CA (US)

( * ) Notice: Subject to any disclaimer, the term of this patent is extended or adjusted under 35 U.S.C. 154(b) by 472 days.

(21) Appl. No.: 13/874,191

(22) Filed: Apr. 30, 2013

(51) Int. Cl.
*G02B 27/01* (2006.01)
*G02B 27/42* (2006.01)

(52) U.S. Cl.
CPC ........ *G02B 27/0172* (2013.01); *G02B 27/0101* (2013.01); *G02B 27/4211* (2013.01); *G02B 2027/011* (2013.01)

(58) Field of Classification Search
CPC .. G02B 27/01; G02B 27/0101; G02B 27/017; G02B 27/0172; G02B 2027/011; G02B 2027/0112; G02B 2027/0116; G02B 2027/013; G02B 2027/0194
See application file for complete search history.

(56) References Cited

U.S. PATENT DOCUMENTS

| | | | |
|---|---|---|---|
| 4,218,111 A | | 8/1980 | Withrington et al. |
| 4,968,117 A | | 11/1990 | Chern et al. |
| 5,257,133 A | | 10/1993 | Chen |
| 5,821,911 A | | 10/1998 | Jachimowicz |
| 5,880,888 A | | 3/1999 | Schoenmakers et al. |
| 5,886,822 A | | 3/1999 | Spitzer |
| 5,886,824 A | * | 3/1999 | Takahashi .......... G02B 17/0816 359/631 |
| 6,111,701 A | | 8/2000 | Brown |
| 6,829,095 B2 | | 12/2004 | Amitai |
| 7,672,055 B2 | | 3/2010 | Amitai |
| 8,384,999 B1 | | 2/2013 | Crosby et al. |
| 2002/0122259 A1 | * | 9/2002 | Chen .................. G02B 27/0172 359/631 |
| 2005/0046954 A1 | * | 3/2005 | Achtner .................. G02B 3/04 359/630 |
| 2007/0070859 A1 | | 3/2007 | Hirayama |
| 2007/0236800 A1 | * | 10/2007 | Cakmakci .......... G02B 27/0712 359/630 |
| 2009/0190222 A1 | * | 7/2009 | Simmonds ........... G02B 6/0028 359/567 |
| 2009/0201589 A1 | * | 8/2009 | Freeman .............. H04N 9/3129 359/630 |
| 2012/0250306 A1 | * | 10/2012 | Sugiyama .............. B60K 35/00 362/231 |

FOREIGN PATENT DOCUMENTS

EP 1 930 762 A1 6/2008
EP 1 465 003 B1 12/2008

OTHER PUBLICATIONS

Cakmakci, O. et al., "Head-Worn Displays: A Review", IEEE, Journal of Display Technology, vol. 2, No. 3, Sep. 2006, pp. 199-216.
Mukawa, H. et al., "8.4: *Distinguished Paper*: A Full Color Eyewear Display using Holographic Planar Waveguides", SID Symposium Digest of Technical Papers, May 2008, vol. 39, Issue 1, pp. 89-92.
Cakmakci, O. et al. "Design of a Freeform Single-Element Head-Worn Display", Proc. of SPIE vol. 7618, 761803, 2010, 6 pages.

* cited by examiner

*Primary Examiner* — Kimberly N Kakalec
(74) *Attorney, Agent, or Firm* — Blakely Sokoloff Taylor & Zafman LLP (57) ABSTRACT

An optical apparatus for a see-through near-to-eye display includes a diffractive optical combiner, one or more refractive correction lenses, and a diffractive correction element. The diffractive optical combiner has an eye-ward side and an external scene side and includes a reflective diffraction grating that is at least partially reflective to image light incident through the eye-ward side and at least partially transmissive to external scene light incident through the external scene side. The one or more refractive correction lenses are disposed in an optical path of the image light to aid in pre-correcting aberrations induced in the image light after reflection off of the diffractive optical combiner. The diffractive correction element is disposed in the optical path of the image light to pre-compensate for lateral color aberrations induced in the image light after reflection off of the diffractive optical combiner.

25 Claims, 11 Drawing Sheets

FIG. 1

$$z(r) = \frac{cr^2}{1+\sqrt{1-c^2r^2(1+k)}} + Ar^4 + Br^6$$

DIFFRACTIVE SEE-THROUGH DISPLAY WITH HYBRID-OPTICAL ABERRATION COMPENSATION

TECHNICAL FIELD

This disclosure relates generally to the field of optics, and in particular but not exclusively, relates to head-worn displays.

BACKGROUND INFORMATION

In the field of optics, a combiner is an optical apparatus that combines two images together, from either the same side of the combiner (reflective/reflective, or transmissive/transmissive) or from the two different sides of the combiner (reflective/transmissive). Often times, optical combiners are used in heads up displays ("HUDs"), sometimes referred to as head mounted displays ("HMDs") or near-to-eye displays, which allow a user to view a display image superimposed over an external view. The HUD enables the user to view the display image without having to look away from his usual viewpoint. The term HUD originated from its use in avionics, which enabled a pilot to view information while looking forward with his head up, as opposed to looking down at an instrument panel. Conventional HUD combiner implementations include tilted dichroic plates, holographic combiners, transparent substrates used at an angle (e.g., beamsplitters), and zero power shells.

Two versions of combiners exist. The first version combines two fields without adding any optical power to either field (typically a tilted dichroic plate or zero power shell). The second version has optical power, in addition to the combining functionality. The optical power is used to form a virtual magnified image of a microdisplay located at a specific distance from the combiner. Field of view is set by the application requirements. The field of view and the desired microdisplay diagonal determine the focal length (inversely related to the optical power) of the optical combiner.

Holographic combiners are typically used in military applications, due to their significant costs, but do provide a high quality HUD. Holographic combiners can be fabricated by exposing a dichromated gelatin, silver halides, or photopolymers to a pair of intersecting laser beams (reference and object beams). The interference pattern between these beams is recorded into the holographic media thereby forming the holographic combiner after curing. Holographic combiners have a number of drawbacks. They are expensive to fabricated, difficult to mass produce, and have limited life spans (e.g., begin to degrade due to temperature, humidity, pressure and other harsh environmental conditions).

Transparent substrates used at an angle (i.e., a beamsplitter) have been used in automobiles to present the driver with HUD information on the windshield. These optical combiners are made of a clear see-through substrate upon which an external image source displays the CGI. However, since the clear see-through substrate is typically a flat substrate without optical power so as not to distort the external FOV, the clear substrate must be angled (e.g., near 45 degrees) and bulky external magnification lenses are used to expand the display image over the display region. The bulky external lenses and angled nature of the clear see-through substrate combiners do not lend themselves well to compact arrangements, such as HMDs.

Zero-power shells are used to undo the optical power of the combiner such that a ray incident on the combiner from the world side at a particular angle goes out at the same angle towards the eyebox. The term shell merely describes that in see-through mode of operation, there is an inner surface with optical power and outer surface designed to satisfy the zero power condition, combining both surfaces to form a shell.

The above mentioned optical combiners each have their own respective drawbacks, which have limited their use to niche markets. In order to broaden the adoption of an HMD outside of a particular niche market, such an HMD should be implemented with a low cost optical combiner that is compact, lightweight, durable, and provides a good quality image without undue optical aberration.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system, and methods of fabrication of a see-through near-to-eye display including a diffractive optical combiner and aberration compensation optics are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
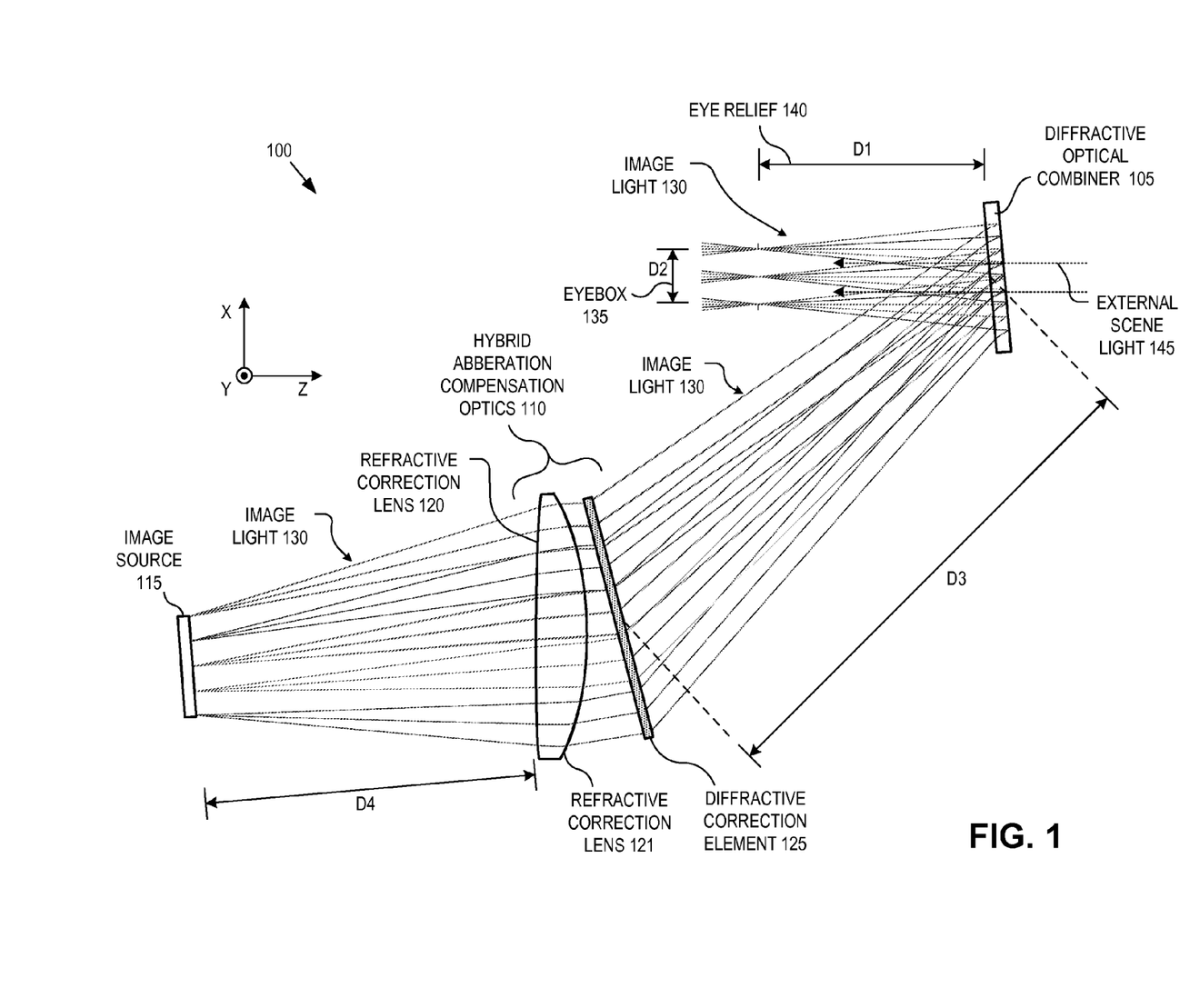
FIG. 1 illustrates an optical assembly including hybrid aberration compensation optics arranged in a see-through near-to-eye configuration, in accordance with an embodiment of the disclosure.

FIG. 1 illustrates an optical assembly 100 arranged in a see-through near-to-eye configuration, in accordance with an embodiment of the disclosure. The illustrated embodiment of optical assembly 100 includes a diffractive optical combiner 105, hybrid aberration compensation optics 110, and an image source 115. The illustrated embodiment of hybrid aberration compensation optics 110 includes refractive correction lenses 120 and 121 and a diffractive correction element 125. A lens is defined herein to be any optical element that has optical power.

During operation, image source 115 emits image light 130 along an emission path that directs image light 130 to be incident upon an eye-ward side of diffractive optical combiner 105 from an oblique angle relative to a normal vector of this surface. Diffractive optical combiner 105 includes a reflective diffraction grating that at least partially reflects image light 130 and collimates it to an eyebox 135 setback from diffractive optical combiner 105 by an eye relief 140. In one embodiment, diffractive optical combiner 105 magnifies image light 130 so that a human eye can view the magnified virtual image in a near-to-eye configuration. A frame assembly may be used to support the components of optical assembly 100 such that diffractive optical combiner 105 is positioned in front of a user's eye by a distance that places the user's pupil within eyebox 135. For example, in one embodiment, D1 is approximately 21 mm while D2 is approximately 4 mm. Other dimensions for eye relief 140 and eyebox 135 may be implemented. Since the illustrated embodiment of optical assembly 100 is configured into a see-through near-to-eye display, diffractive optical combiner 105 is at least partially transmissive to external scene light 145 incident through an external scene side of diffractive optical combiner 105. Image light 130 is perceived by the user as an image that is superimposed over external scene light 145 (e.g., image light 130 augments external scene light 145).

Reflection of image light 130 by diffractive optical combiner 105 may not be ideal; rather various optical aberrations may be induced in the reflected image light 130. These optical aberrations may include spherical aberration, coma, and astigmatism distortion, and lateral color aberrations. In one embodiment, diffractive correction element 125 primarily corrects for color aberrations induced by reflection off of diffractive optical combiner 105 while refractive corrections lenses 120 and 121 primarily correct for residual astigmatism, although diffractive correction element 125 may contribute some astigmatism correction and refractive correction lenses 120 and 121 and/or diffractive correction element 125 may also contribute some correction to one or more of the other aberrations listed above.

Reflection of image light 130 off of diffractive optical combiner 105 causes color aberrations, also referred to as color separation or spectral spatial separation, as a result of the finite linewidth (or bandwidth) of image light 130 emitted by image source 115. Diffraction gratings exchange different diffraction angles for different wavelengths. Thus, color separation can be reduced or prevented by using a narrow linewidth lamp source, such as a laser source, within image source 115 that produces light having a sub-nanometer linewidth. However, the inclusion of diffractive correction element 125 pre-compensates for the color separation induced by diffractive optical combiner 105 thereby reducing the constraint that the lamp source produce a narrow linewidth (e.g., sub-nanometer). This pre-compensation is induced dispersion that balances the aberration/dispersion caused by diffractive optical combiner 105. For example, image source 115 may be generated with light having linewidths of greater than 10 nm (e.g., up to 40 nm full width half-max) while maintaining acceptable image quality. In other words, the pre-compensation induced by diffractive correction element 125 is a transmission mode diffraction that is complementary to a reflection mode diffraction caused by diffractive optical combiner 105 to reduce wavelength dependent separation of image light 130 received at the eyebox 135.

Refractive correction lenses 120 and 121 are designed to pre-compensate for at least a portion of the astigmatism induced by diffractive optical combiner 105; however, refractive correction lenses 120 and 121 may also be designed to at least partially compensate for the other optical aberrations mentioned above. Some of these aberrations are induced by diffractive optical combiner 105 due to its flat, planar design. Specifically, the Petzval curvature contribution of a flat diffractive optical element is zero. While diffractive optical combiner 105 could be curved in some designs, such designs will typically be more complex or require additional fabrication steps to achieve. Accordingly, refractive correction lenses 120 and 121 operate to balance aberrations in a complementary or partially complementary manner to offset the aberrations induced by diffractive optical combiner 105, and in particular, the astigmatism induced by a flat, planar implementation of diffractive optical combiner 105.

Refractive correction lenses 120 and 121 may each assume a variety of different shapes including spherical, aspherical, toroidal, freeform, or otherwise. In one embodiment, refraction correction lens 121 is a refractive lens having an aspherical shape. In one embodiment, refractive correction lens 120 is a spherical lens having a single radius of curvature. Refractive correction lens 120 may assume more complex shapes (e.g., toroidal, aspherical, freeform, etc.); however, in embodiments where the refractive portion of hybrid aberration compensation optics 110 are fabricated from a single unitary lens body (e.g., single block of refractive material), the fabrication and tolerance testing of a dual sided lens with two complex shaped surfaces is more complex and expensive. As such, the combination of a spherical lens and an aspherical lens may result in a reasonable compromise between fabrication expense and optical performance, when used in connection with diffractive correction element 125.

The optical elements within optical assembly 100 may assume a variety of different orientations, positions, and configurations. For example, the order of refractive correction lenses 120, 121 and diffractive correction element 125 may be changed up (e.g., diffractive correction element 125 may be first or positioned between refractive correction lenses 12 and 121). In one embodiment, diffractive correction element 125 may be disposed on the surface of one of the refractive correction lenses 120 or 121. In yet another embodiment, refractive correction lenses 120, 121 and diffractive correction element 125 may be integrated into a unitary hybrid diffractive-refractive element or all of them separated into individual components.

Diffractive correction element 125 is positioned off-axis laterally from diffractive optical combiner 105 with a separation distance D3 and image source 115 is separated from refractive correction lens 120 by a separation distance D4. In one embodiment where image source 115 has a diagonal size of 0.35" and diffractive optical combiner 105 has a diameter of 10 mm, D3 is approximately 32 mm, D4 is approximately 25 mm, and an off-axis reflection angle for image light 130 is 36 degrees. Other dimensions may be implemented.

In one embodiment, diffractive correction element 125 is a planar diffraction grating constructed to operate in a transmission mode about the 525 nm wavelength using the +1 diffracted order. In one embodiment, diffractive correction element 125 has a rotationally symmetric phase. Diffractive correction element 125 may be fabricated by forming (e.g., lithographic etching) a diffraction pattern within fused silica, sapphire, calcium fluoride, or otherwise. In one embodiment, the grating pattern of diffractive correction element 125 is defined by the following phase polynomial:

$$\text{Phase}(x,y) = C1*x + C2*x^2 + C3*y^2 + C4*x*y^2,$$

where C1, C2, and C3 are coefficients and x & y represent orthogonal linear dimensions in mm. In one embodiment, C1=0.565, C2=−0.00162, C3=−0.00162, and C4=−2.041e-005 while the diffraction order is +1 and for a wavelength of 525 nm. Of course diffractive correction element 125 may be implemented with other coefficient values and at other wavelengths. Furthermore, the diffractive correction element can have a rotationally symmetric or an asymmetric phase function.

Figure 2A:
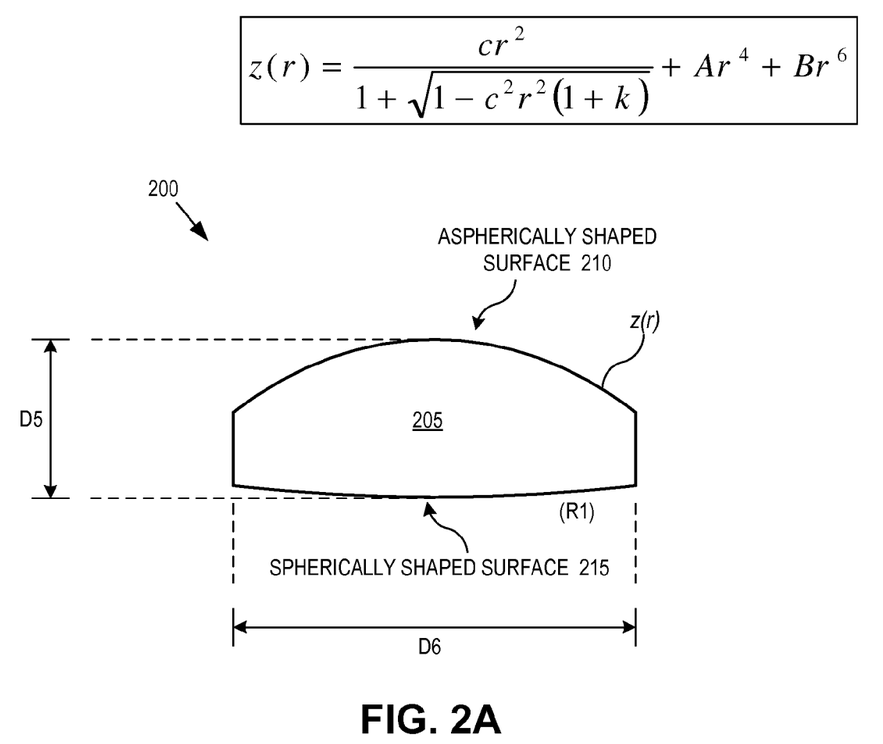
FIGS. 2A & 2B illustrate refractive correction optics that balance optical aberrations induced by a diffractive optical combiner, in accordance with an embodiment of the disclosure.
Figure 2B:
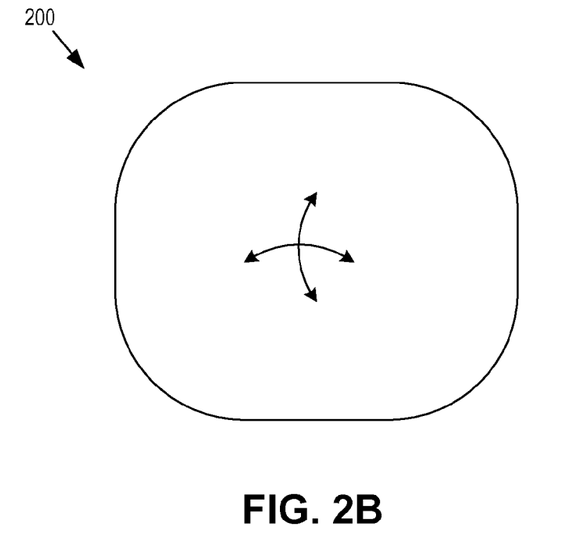

FIGS. 2A & 2B illustrate refractive correction optics 200 that balance optical aberrations induced by diffractive optical combiner 105, in accordance with an embodiment of the disclosure. Refractive correction optics 200 represent one possible implementation of the refractive portion of hybrid aberration compensation optics 110 illustrated in FIG. 1. The illustrated embodiment of refractive correction optics 200 includes a lens body 205 having an aspherically shaped surface 210 and a spherical shaped surface 215. FIG. 2A is a side profile view while FIG. 2B is a top profile view of aspherically shaped surface 210.

In the illustrated embodiment, lens body 205 is a unitary lens body fabricated of a single uniform body of refractive material. For example, lens body 205 may be fabricated of an optical grade plastic such as Zeonex Z-E48R. Other refractive materials may be used including other optical glasses, optical plastics, or otherwise. A unitary lens body may be fabricated using injection molded techniques, diamond turning, or otherwise. In other embodiments (not illustrated), the aspherical correction lens and the spherical correction lens may be fabricated from separate lens bodies that are positioned adjacent to each other and in some cases fused together.

Lens body 205 may be initially fabricated from a lens having a circular top profile shape, which is then cut to form the truncated circle shape illustrated in FIG. 2B. This truncated circle shape (or even rectangular shape), conforms the top profile shape to match the rectangular shape of image source 115, thereby providing a compact form factor. In one embodiment, lens body 205 has a thickness D5 approximately equal to 4 mm and an aperture diameter D6 of approximately 22 mm for an image source having a diagonal length of 0.35". Of course, other dimensions may be implemented.

Aspherical shaped surface 210 forms an asphere refractive lens having a shape defined by the sag function z(r) (illustrated in FIG. 2A), where c represents the base curvature at the vertex, k represents the conic constant, r represents the radius from the optical axis, and A & B represent coefficients of the fourth and sixth order aspheric terms, respectively. In one embodiment, z(r) may be defined with the following coefficients A=6.08e-006, B=2.2546e-008, and c=−0.04676. In one embodiment, spherical shaped surface 215 has a radius of curvature R1 equal to 174.88 mm. Aspherically shaped surface 210 may be defined using other values for coefficients A, B, and c and spherical shaped surface 215 may be implemented with a different curvature.

Figure 3:
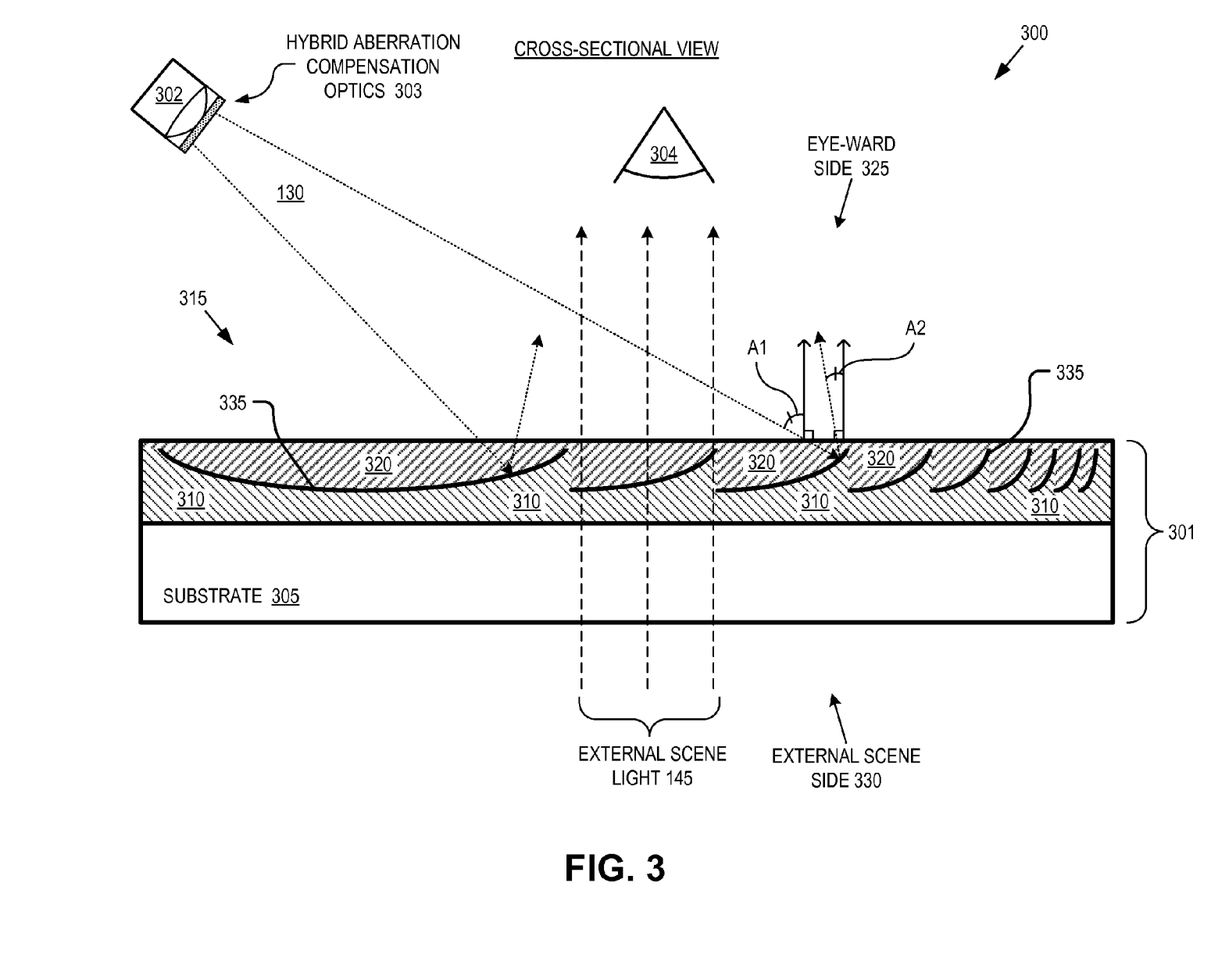
FIG. 3 illustrates a see-through near-to-eye display implemented with a sandwiched diffractive optical combiner and aberration compensation optics, in accordance with an embodiment of the disclosure.
Figure 4:
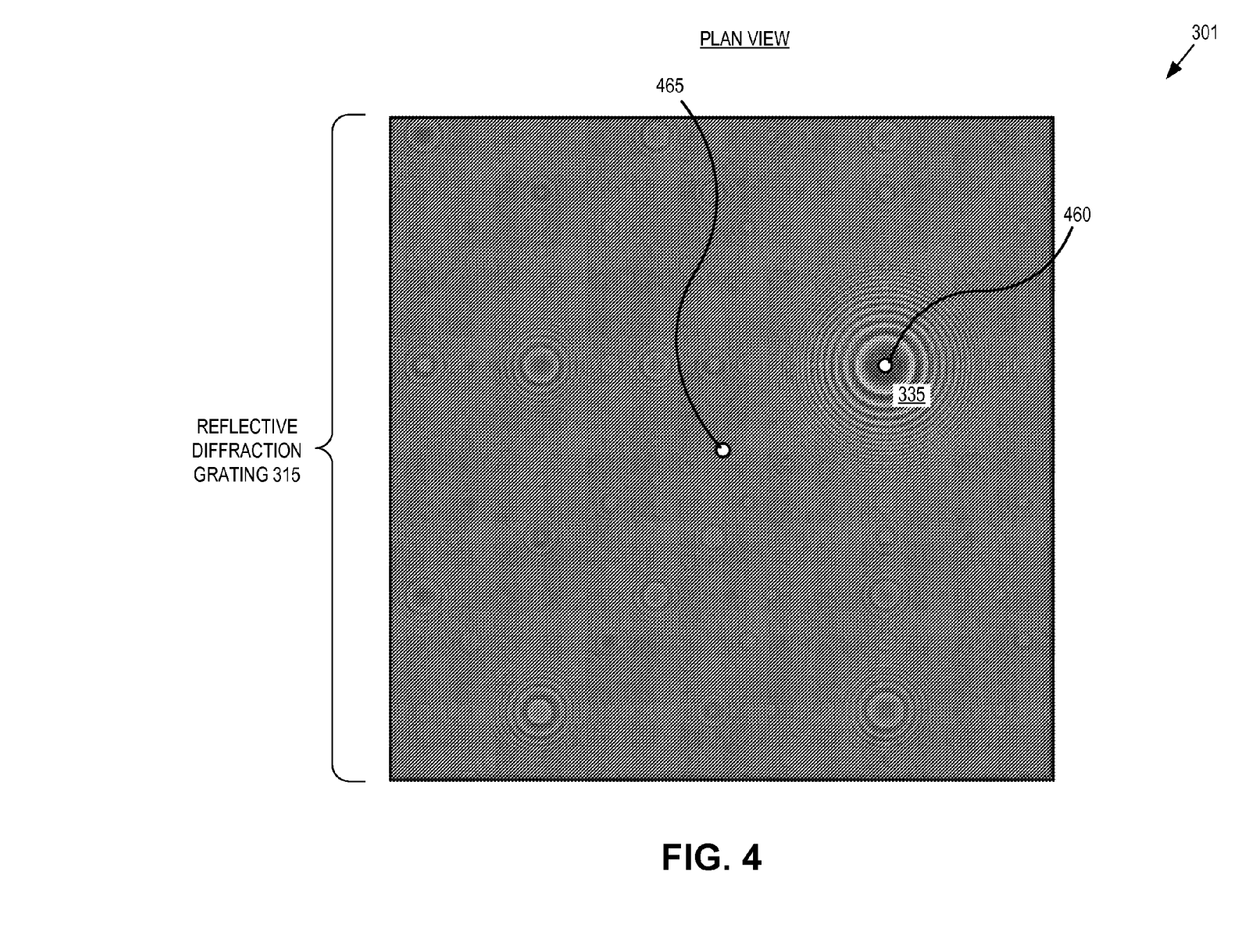
FIG. 4 is a plan view of a sandwiched diffractive optical combiner, in accordance with an embodiment of the disclosure.

FIG. 3 illustrates a see-through display 300 including a sandwiched diffractive optical combiner 301 and aberration compensation optics, in accordance with an embodiment of the disclosure. FIG. 3 illustrates a cross-sectional view of optical combiner 301 while FIG. 4 illustrates a plan view of the same. See-through display 300 is one possible implementation of optical assembly 100 (illustrated in FIG. 1) and correspondingly, sandwiched diffractive optical combiner 301 is one possible implementation of diffractive optical combiner 105.

The illustrated embodiment of see-through display 300 includes a sandwiched diffractive optical combiner 301, image source 302, and hybrid aberration compensation optics 303. The illustrated embodiment of optical combiner 301 includes a substrate 305, a base sandwich layer 310, a reflective diffraction grating 315 (e.g., a diffractive optical element operated in reflection), a planarization sandwich layer 320, an eye-ward side 325, and an external scene side 330. The illustrated embodiment reflective diffraction grating 315 is formed of a two-dimensional ("2D") array of three-dimensional ("3D") diffraction element shapes formed into base sandwich layer 310 with partially reflective elements 335 coated onto the 3D diffraction element shapes and conforming thereto.

Diffractive optical combiner 301 is referred to as a sandwiched optical combiner since it sandwiches reflective diffraction grating 315 between two material layers (i.e., base sandwich layer 310 and planarization sandwich layer 320) having substantially equal, if not identical, indexes of refraction. By doing this, optical combiner 301 simultaneously operates in both reflection and transmission modes with each mode having different characteristics. In reflection, image source 302 is positioned on the same side of optical combiner 301 as the user's eye 304 (i.e., eye-ward side 325). Since reflective diffraction grating 315 is composed of partially reflective elements 335, a portion of image light 130 output from image source 302 is reflected back towards the user's eye 304. In transmission, the diffractive effects of reflective diffraction grating 315 are eliminated by using the same or similar index of refraction material above and below partially reflective elements 335. Since partially reflective elements 335 are also partially transmissive and sandwiched in substantially uniform index material(s), the portion of external scene light 145 that passes through reflective diffraction grating 315 is not diffracted, but rather passes to eye 304 substantially without experiencing optical distortion or power. By simultaneously operating diffractive optical combiner 301 in both reflective and transmissive modes, it can be used to overlay image light 130 onto external scene light 145 to provide a type of augmented reality to the user.

Hybrid aberration compensation optics 303 are positioned in the optical path of display light 130 between image source 302 and optical combiner 301 to balance or otherwise apply pre-aberration compensation to image light 130 before the light is incident upon optical combiner 301, as discussed above. Aberration compensation optics 303 may be held in place in front of the emission aperture of image source 302 by lens mounts. These lens mounts may be a slot into which aberration compensation optics 303 are inserted or slid, a clip attachment, a hinging clasp or clamp, transparent glue, a friction fit, magnetic mount, or otherwise.

In some embodiments, the shape, size, orientation, and placement of the individual 3D diffraction element shapes formed into base sandwich layer 310 may be designed to provide optical power for magnifying image light 130. This magnifying configuration may be particularly useful in near-to-eye configurations, such as head mountable displays ("HMDs") and some types of heads up displays ("HUDs"), such as scopes. The generic design of diffraction gratings that provide optical power is well known. For example, design of diffractive optics is discussed in "Applied Digital Optics: From Micro-optics to Nanophotonics" by Bernard Kress and Patrick Meyrueis, published by John Wiley and Sons in 2009. In particular, this book discusses how to design and subsequently carve out diffraction structures (microscopic grooves) and select their depth to maximize the amount of light diffracted in a specific diffraction order, while reducing the light diffracted in the zero and higher diffraction orders.

In one embodiment, reflective diffraction grating 315 is an off-axis lens, which is capable of receiving input light at incident angle A1 and reflects the image light along a reflection path having an emission angle A2 that is different from A1. In other words, reflective diffraction grating 315 can redirect the incident light at an angle that is not equal to the incident angle, in contrast to a traditional mirror where the incident and reflected angles are always equal. Note, A1 and A2 are measured along the chief ray of display source 302 relative to the normal of the emission surface of optical combiner 301 out which the reflected image light 130 is emitted. In FIG. 3, the emission surface coincides with eye-ward side 325 of planarization sandwich layer 320. In one embodiment, the angle between the chief incident ray and the surface normal of optical combiner 301 (angle A1) is 36 degrees. This enables image display 302 to be positioned laterally to optical combiner 301 so as not to block external scene light 145. In HMD configurations, off-axis geometries permit image display 302 to be positioned peripherally in the temple region of the user thereby not obstructing the user's forward vision. Off-axis optical power using diffractive optics also provides a specific angular bandwidth to reflective diffraction grating 315. This helps reduce distractions due to backside reflections and improve contrast of the reflected image light 130 over external scene light 145. Diffraction grating 315 may have a phase that is either rotationally symmetric or rotationally asymmetric.

In FIG. 4, the off-axis optical power is provided by chirping the diffraction grating pattern and offsetting the center 460 of the diffraction pattern relative to the user's center of vision 465. In the illustrated embodiment, the pattern center 460 is denoted as the center of the largest partially reflective element 335. As the pattern extends out from center 460, partially reflective elements 335 become gradually smaller. In FIGS. 3 and 4, the 3D diffraction element shapes have parabolic cross-sectional shapes (see FIG. 3) and rotationally symmetric (circular or spherical lens) or rotationally asymmetric (aspheric lens) perimeter shapes (see FIG. 4). However, other cross-sectional shapes and perimeter shapes (e.g., elliptical, etc.) may be used to create reflective diffraction grating 315. The illustrated embodiment of FIG. 4 is a 16 phase level off-axis diffractive lens; however, other number of phase levels may be used, the most effective lens having an infinite number of phase levels (quasi analog surface relief diffractive lens). In one embodiment, reflective diffraction grating 315 is defined by the following phase polynomial:

$$\text{Phase}(r)=C1*x+C2*x^2+C3*y^2+C4*x*y^2,$$

where C1, C2, C3, and C4 are coefficients and x and y represent orthogonal linear dimensions in mm. In one embodiment, reflective diffraction grating 315 is designed for wavelengths in a 40 nm linewidth about 525 nm with C1=0.565, C2=−0.00162, C3=−0.00162, and C4=−2.041e-005 while the diffraction order is +1 and has an asymmetric phase. Diffraction grating 315 may be implemented with other coefficient values and at other wavelengths.

Reflective diffraction grating 315 is formed by overlaying each 3D diffraction element shape with a partially reflective element 335. Partially reflective elements 335 each conformally coat a corresponding 3D diffraction element shape thereby creating a reflective structure that assumes the shape and orientation of the underlying 3D diffraction element shape.

Partially reflective elements 335 may be made of a variety of different materials. In one embodiment, partially reflective elements 335 are fabricated of a layer of conventional non-polarizing beam splitter material (e.g., thin silver layer, $CrO_2$, etc.). The degree of reflectivity may be selected based upon the particular application (e.g., primarily indoor use, outdoor use, combination use, etc.). In one embodiment, partially reflective elements 335 comprise a 10% reflective 100 nm layer of $CrO_2$.

In one embodiment, partially reflective elements 335 are fabricated of a multi-layer dichroic thin film structure. Dichroic films can be created to have a selectable reflectivity at a selectable wavelength. Additionally, the dichroic film can be designed to improve the angle selectivity of the reflective diffraction grating 315. A dichroic film can be designed with high reflectivity to a specific wavelength or wavelength band that overlaps with image light 130 and to the angles of incidence of image light 130, while being substantially more transparent to other visible spectrum wavelengths and to the normal incidence of external scene light 145. In this manner, the efficiency of optical combiner 301 can be improved while also increasing the brightness of the transmitted external scene light 145.

In one embodiment, partially reflective elements 335 are fabricated of polarizing beam splitter material that substantially reflects one linear polarization of incident light while substantially passing the orthogonal linear polarization. In this case, image source 302 could be designed to emit polarized image light matching the reflection characteristic of partially reflective elements 335. Since ambient light typically has a random polarization, approximately 50% of external scene light 230 would pass through optical combiner 301 to eye 304.

Image source 302 may be fabricated using a variety of compact image source technologies such as the various micro-displays used today in pico-projectors, liquid crystal on silicon ("LCOS") displays, backlit liquid crystal displays, organic light emitting diode ("OLED") displays, quantum dot array displays, light emitting diode ("LED") arrays, or otherwise. The image source 302 need not be a laser source, but rather may be an LED configured to provide a light having a finite linewidth about 40 nm full width half maximum. Diffractive optical combiner 301 may be fabricated of a variety of clear optically transmissive materials, including plastic (e.g., acrylic, thermo-plastics, poly-methyl-metha-crylate (PMMA), ZEONEX-E48R, glass, quartz, etc.). For example, in one embodiment, substrate 305, base sandwich layer 310, and planarization sandwich layer 320 are fabricated of plastic. In another embodiment, substrate 305 is glass while base sandwich layer 310 and planarization sandwich layer 320 are fabricated of silicon dioxide. Other material combinations may be used.

Figure 5:
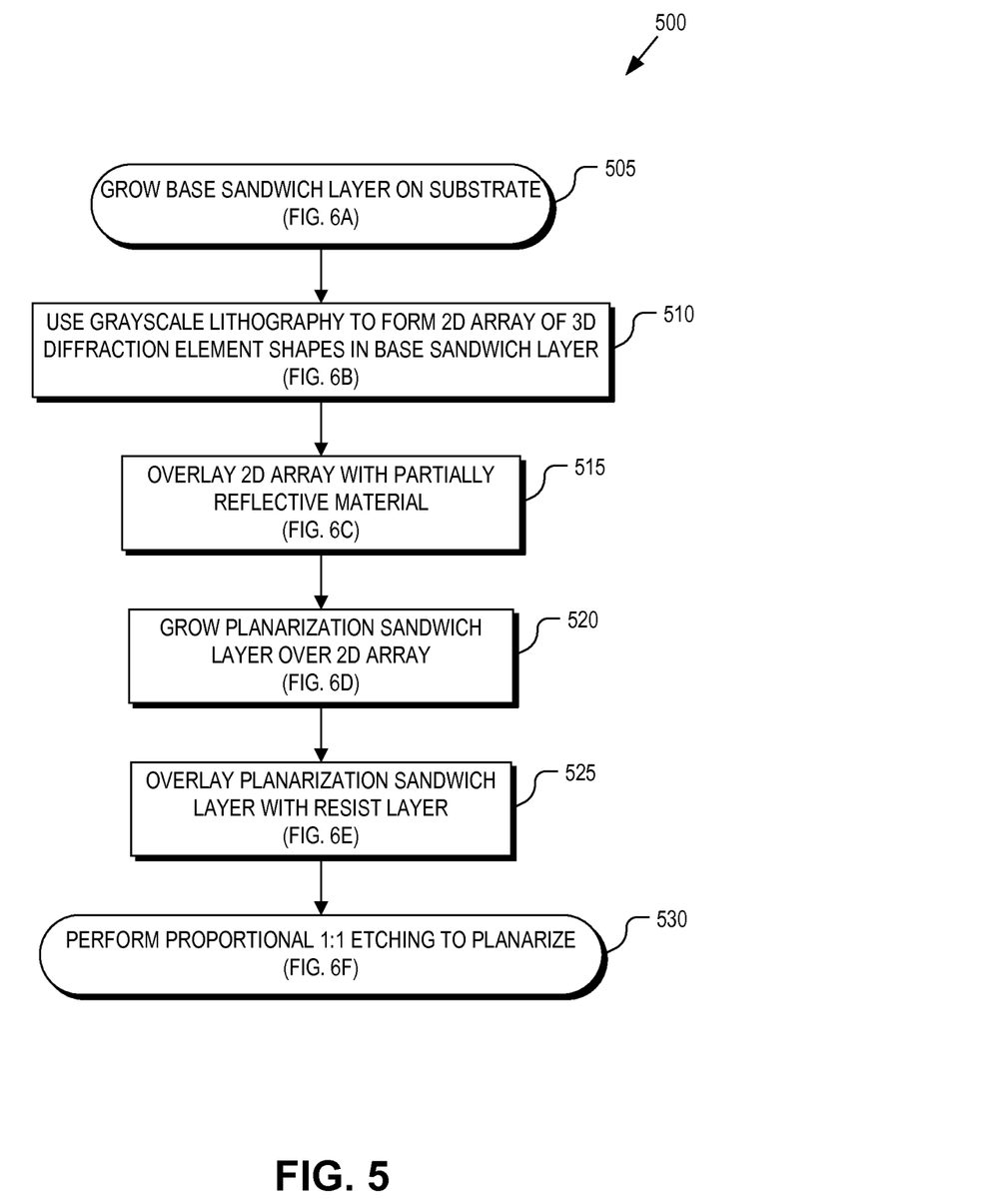
FIG. 5 is a flow chart illustrating a process for fabricating a sandwiched diffractive optical combiner using lithography, in accordance with an embodiment of the disclosure.
Figure 6A:
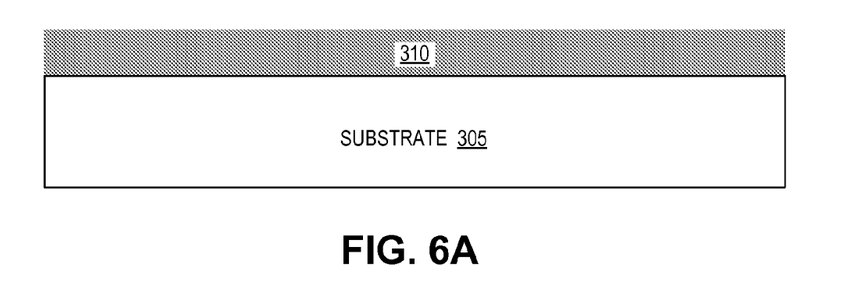
FIGS. 6A-6F illustrate fabrication steps for fabricating a sandwiched diffractive optical combiner using lithography, in accordance with an embodiment of the disclosure.
Figure 6B:
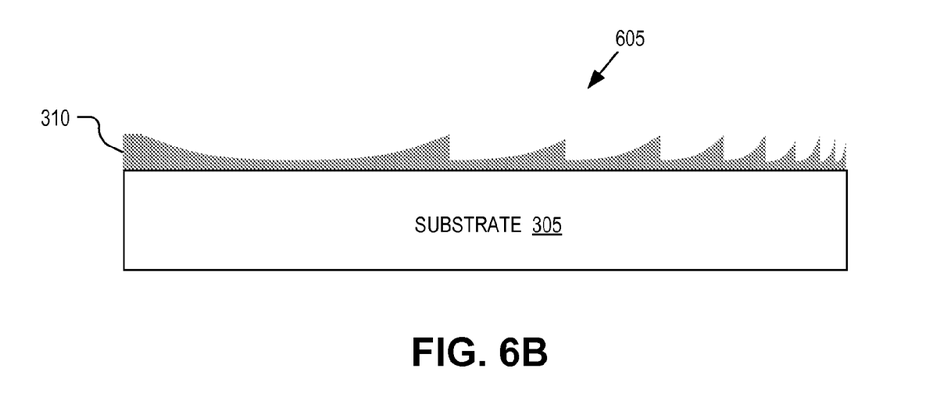
Figure 6C:
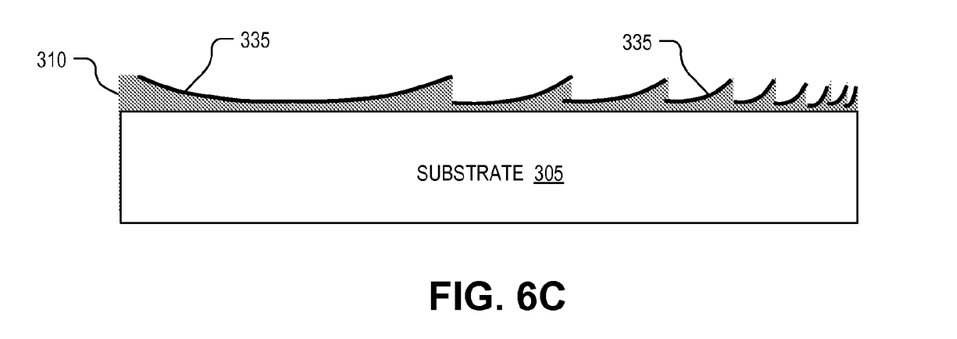
Figure 6D:
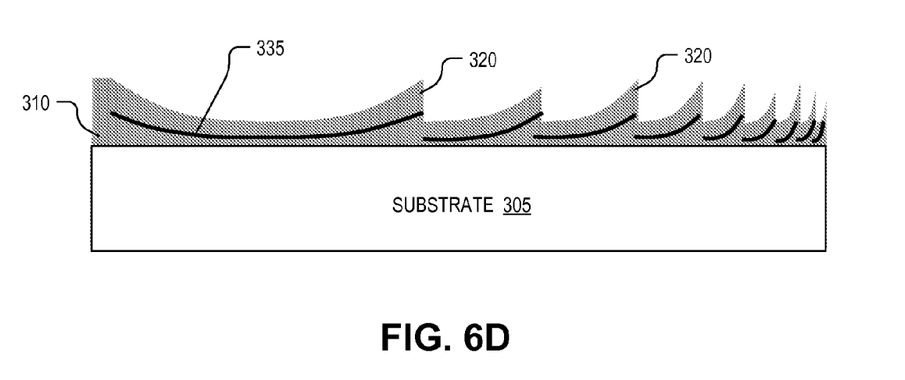
Figure 6E:
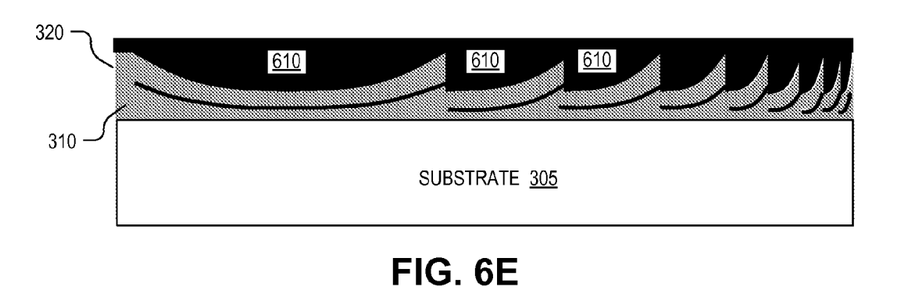
Figure 6F:
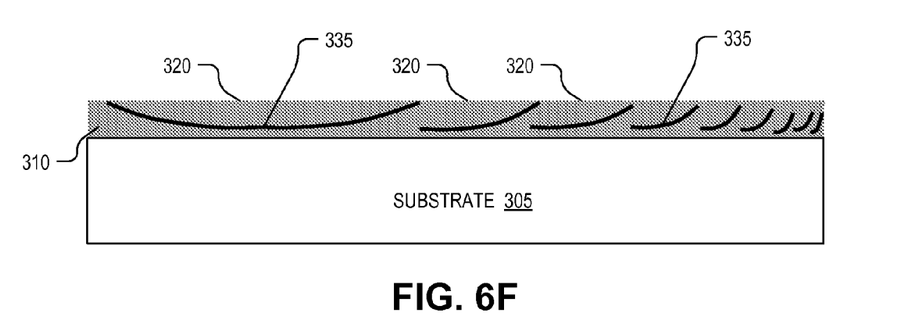

FIG. 5 is a flow chart illustrating an example process 500 for fabricating one embodiment of sandwiched diffractive optical combiner 301 using lithography, in accordance with an embodiment of the disclosure. Process 500 describes one technique for fabricating an embodiment of diffractive optical combiner 301 using silicon dioxide on a glass substrate.

Process 500 is described with reference to FIGS. 6A-F. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In a process block 505, base sandwich layer 310 is deposited onto substrate 305, which is fabricated of a clear material such as glass, quartz, plastic, or otherwise. In this embodiment, base sandwich layer 310 is a layer of silicon dioxide approximately 1 µm thick. In a process block 510, grayscale lithography and reactive ion etching is used to form the 2D array of 3D diffraction shapes 605 into base sandwich layer 310. In a process block 515, shapes 605 are overlaid via sputtering with a layer of partially reflective material. In one embodiment, the partially reflective material layer is approximately 10% reflective (other reflectivity percentages may be used). In one embodiment, the partially reflective material layer is approximately 100 nm thick of CrO2 material. In a process block 520, planarization sandwich layer 320 is deposited onto of the partially reflective material layer. In one embodiment, planarization sandwich layer 320 is deposited to be approximately 1.5 µm thick. Of course, at this stage planarization sandwich layer 320 is not yet planar. In a process block 525, a resist material 610 is coated over planarization sandwich layer 320. Finally, in a process block 530, resist material 610 is removed during planarization, which proceeds to a depth that results in a planar top to planarization sandwich layer 320. Such a process can be implemented as a proportional reactive ion etching (RIE) process (or CAIBE process—Chemically Assisted Ion Beam Etching) where the resist etching rate and the underlying SiO2 etching rate are exactly similar. In one embodiment, chemical-mechanical polishing is used to remove resist layer 610 and planarize planarization sandwich layer 320. In one embodiment, a proportional reactive ion etch with a 1:1 ratio that etches both resist material 610 and planarization sandwich layer 320 at the same rate is used. Other standard or custom planarization techniques may be used.

Mass production techniques may be used to fabricate various other embodiments of diffractive optical combiner 301. For example, a master combiner may be fabricated to be used as a mold for plastic replication via injection molding or hot/UV embossing. Base sandwich layer 310 may be fabricated of thermo-plastic material that is injection molded. Partially reflective elements 335 may be overlaid or coated onto the 2D array of 3D diffraction shapes and planarization sandwich layer 320 laminated over the partially reflective material. Diamond turning with CNC machine-tools may be used in place of lithography to shape the various curved fringes making up the optical combiner. In other embodiments, base sandwich layer 310 may be fabricated using press molding into thermo-plastic or plastic embossing using a roller drum having a negative impression of the 2D array of 3D diffraction shapes disposed thereon.

Figure 7A:
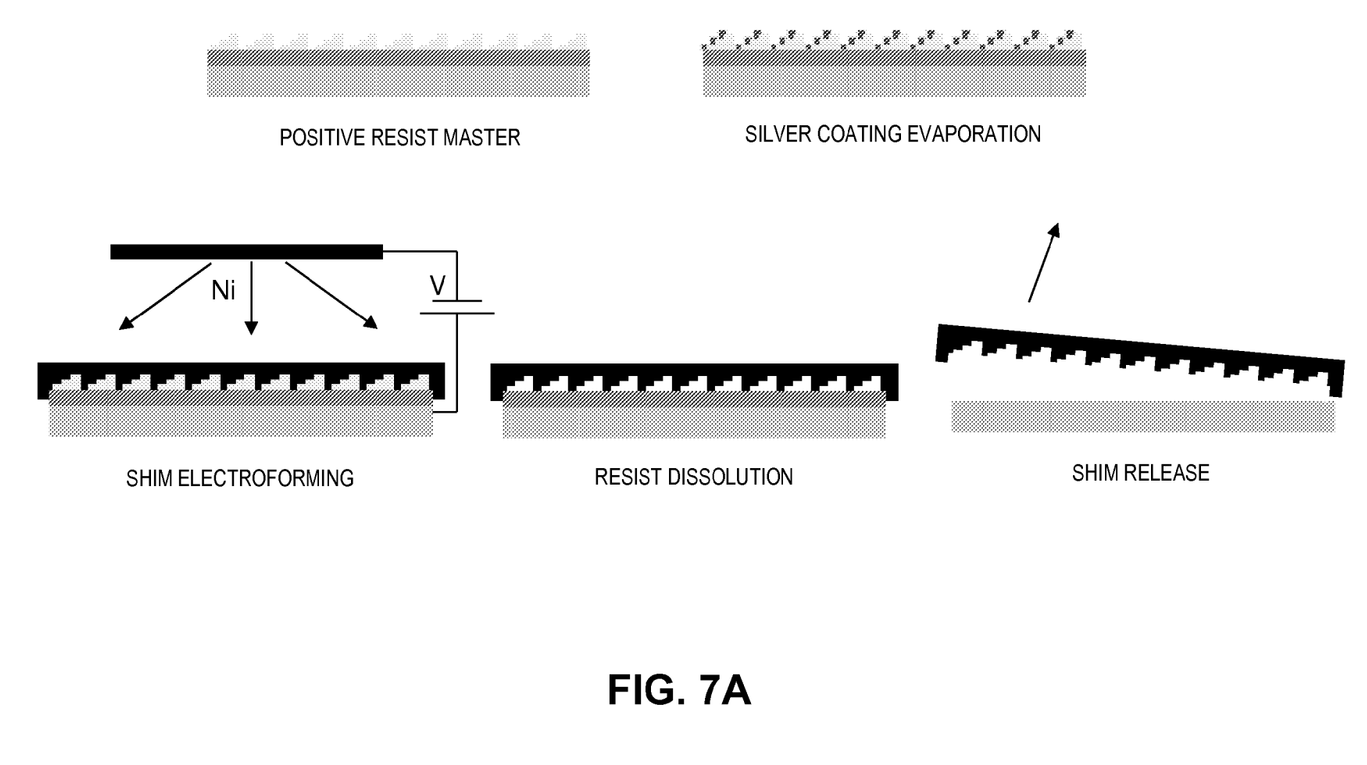
FIGS. 7A-7C illustrate various techniques for mass replication of a diffractive optical combiner, in accordance with embodiments of the disclosure.
Figure 7B:
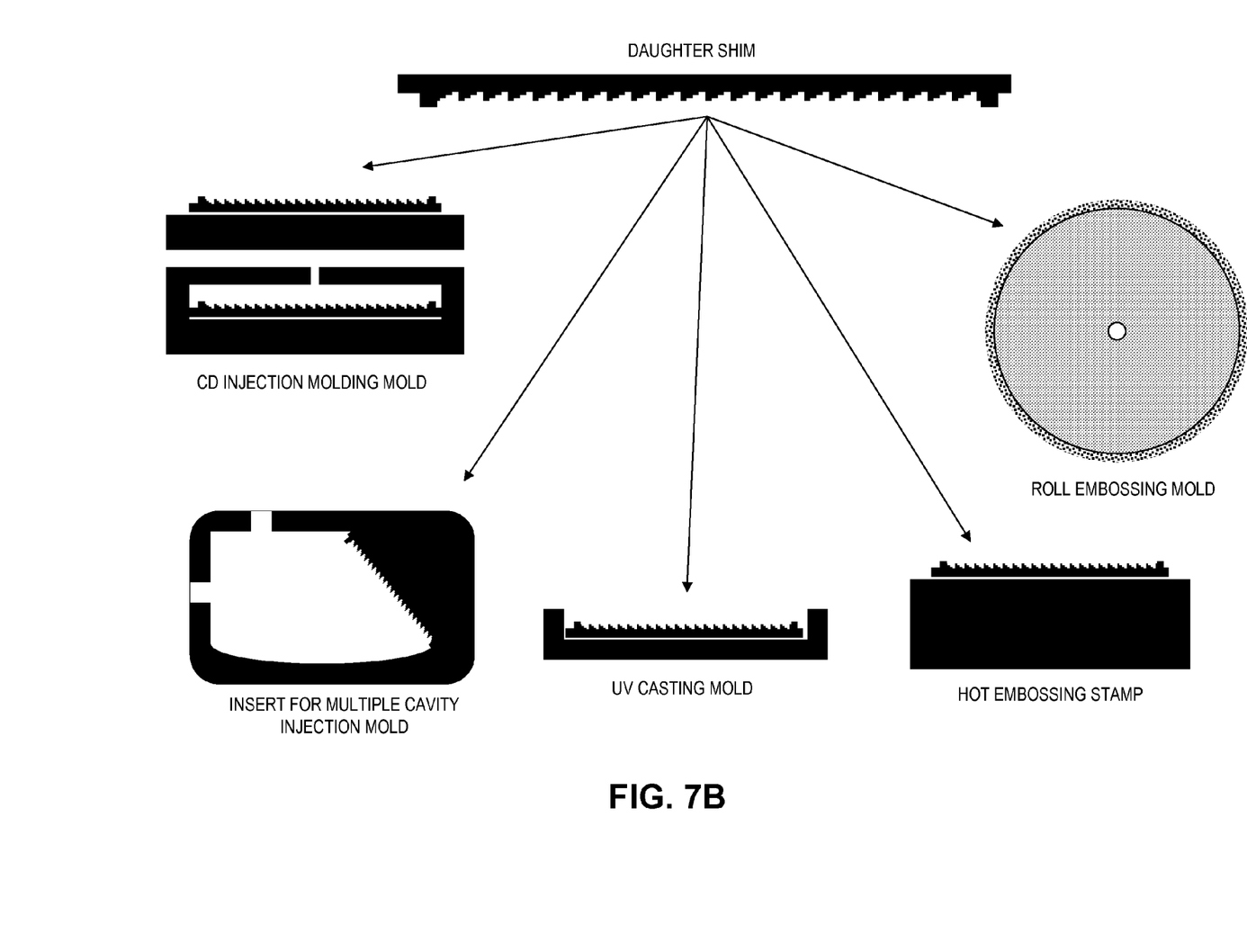
Figure 7C:
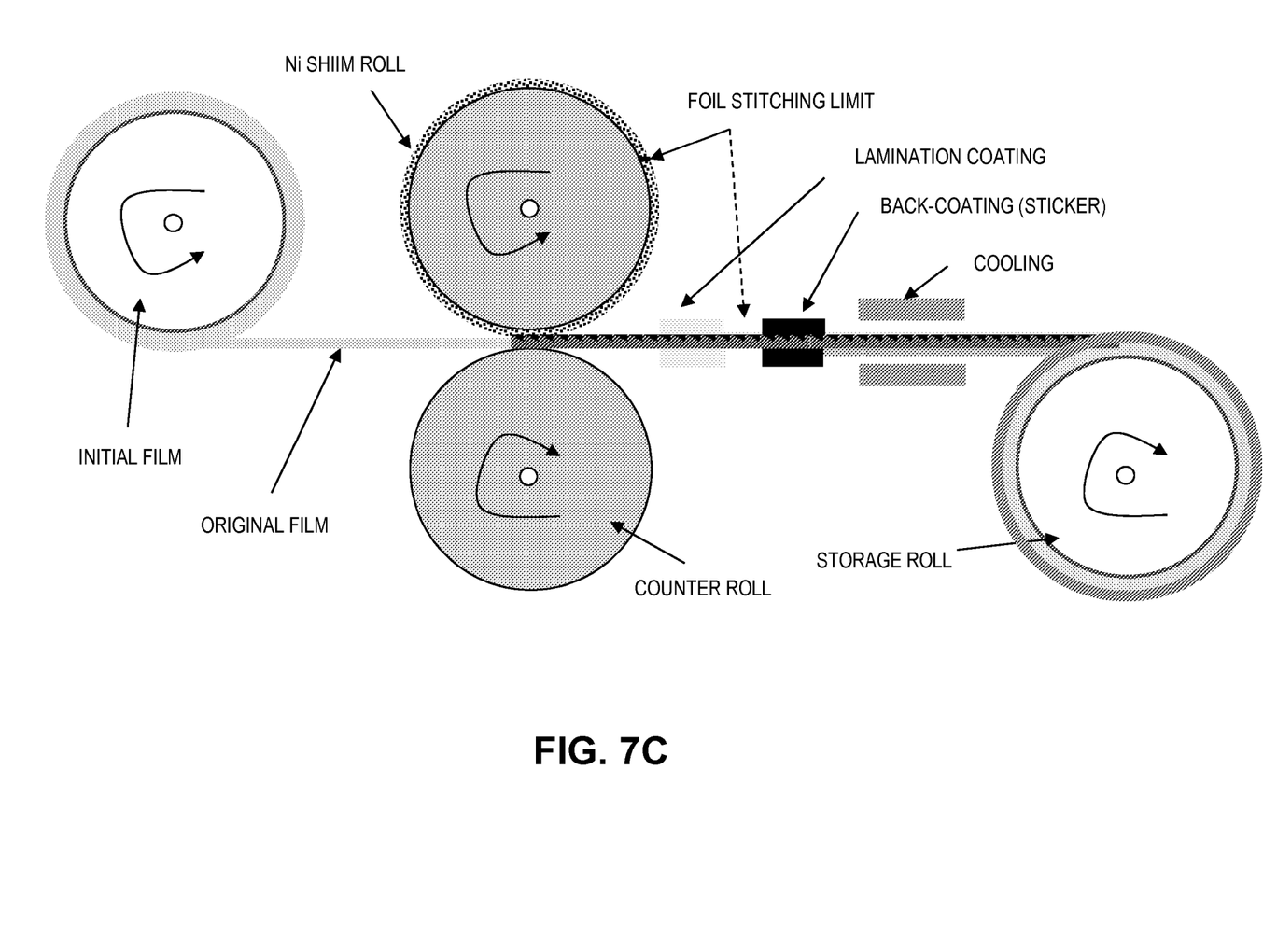

FIGS. 7A-7C illustrate various techniques for mass replication of diffractive optical combiner 301, in accordance with embodiments of the disclosure. FIG. 7A illustrates electroforming of a negative nickel combiner master from a positive resist master. The master can be either produced via microlithography or diamond turning. In the case of micro-lithography, the substrate would typically be flat. The structures produced are negative, similar to the final parts (film). The mold produced on top of these structures is therefore a negative imprint. The replicated film (positive structures again) can be curved in one direction (see FIG. 7B). In the case of diamond turning, the microstructures can be formed on a flat surface (similar to microlithography) or directly on a curved substrate. If produced on a flat substrate, the process to replicate the film is the same as for the lithography enabled master (constrained to 1D curvature and negative structures). If produced on a curved substrate, the structures will be negative, since diamond turning directly produces the final mold.

If the master is directly diamond turned over a non-flat surface, this surface can have curvatures in two directions and then used as a mold. However, in this case it may not be used as a shim for roll-to-roll replication or embossing; rather, injection molding. When using lithography to produce the master, there is a choice to do so in resist or etch down the microstructures within the substrate. In either case, it may be preferable to use the microstructures as a negative pattern on which electro-plating can be used to grow a Nickel layer rather than as a mold. This nickel layer is then peeled off and used as a shim for either roll-to-roll embossing, plate embossing, or as an insert for diamond turning.

When the shim is used as an insert on a 1D curved substrate in an injection molding process, there is no need to stretch the microstructures in order to compensate for conformation onto the 1D surface. If the shim is used to replicate a film to be conformed to a 1D surface, the original microstructures (in the master) have to be compensated (stretched) in order to produce the desired microstructures when the replicated film is conformed to the surface.

FIG. 7B illustrates the use of a negative shim in various plastic replication technology equipment, in accordance with embodiments of the disclosure. Once a mold is fabricated (either via diamond turning or nickel electro-plating as discussed above), the shim or mold can be used in a variety of plastic replication equipment, such as the ones illustrated in FIG. 7B.

FIG. 7C illustrates an example of a roll-to-roll replication of combiner microstructures using the nickel shim described above. FIG. 7C illustrates greater details of a specific roll-to-roll embossing technique in which the nickel shim is applied to a drum and embosses a plastic film, on which a coating as well as an overcoat is applied. In this case the diffractive structures should be stretched in the master design (compensated) in order to produce the desired structures when conformed to the underlying 1D surface.

Figure 8:
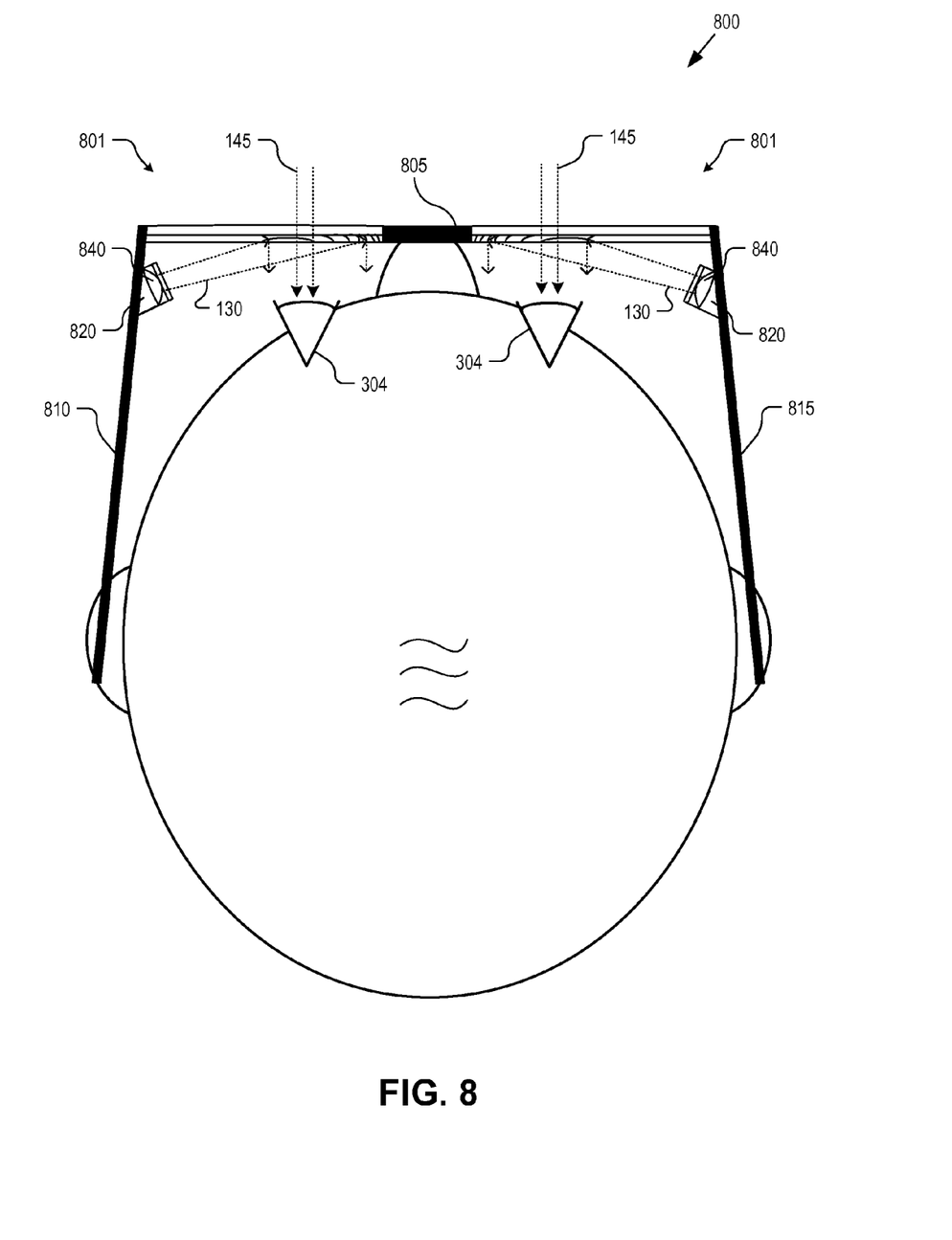
FIG. 8 is a top view of a binocular head mountable display using two see-through displays that each include an aberration compensated diffractive optical combiner assembly, in accordance with an embodiment of the disclosure.

FIG. 8 is a top view of a binocular HMD 800 using a pair of aberration compensated see-through displays 801, in accordance with an embodiment of the disclosure. Each see-through display 801 may be implemented with embodiments of optical assembly 100 or see-through display 300. The see-through displays 801 are mounted to a frame assembly, which includes a nose bridge 805, left ear arm 810, and right ear arm 815. Although FIG. 8 illustrates a binocular embodiment, HMD 800 may also be implemented as a monocular HMD.

The see-through displays 801 are secured into an eye glass arrangement or HMD that can be worn on the head of a user. The left and right ear arms 810 and 815 rest over the user's ears while nose assembly 805 rests over the user's nose. The frame assembly is shaped and sized to position each diffractive optical combiner in front of a corresponding eye 304 of the user. Other frame assemblies having other shapes may be used (e.g., a visor with ear arms and a nose bridge support, a single contiguous headset member, a headband, goggles type eyewear, etc.).

The illustrated embodiment of HMD 800 is capable of displaying an augmented reality to the user. Each see-through display 801 permits the user to see a real world image via external scene light 145. Left and right (binocular embodiment) image light 130 may be generated by image sources 820 mounted to left and right ear arms 810. Aberrations are balanced by hybrid aberration compensation optics 840 to correct for lateral color aberrations due to finite linewidth in image source 115 and other optical aberrations, such as astigmatism, introduced by the diffractive optical combiner upon reflection into eyes 304. Image light 130 is seen by the user as a virtual image superimposed over external scene light 145 as an augmented reality. In some embodiments, external scene light 145 may be partially blocked or selectively blocked to provide sun shading characteristics and increase the contrast of image light 130.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical apparatus for a see-through near-to-eye display, comprising:
   a diffractive optical combiner having an eye-ward side and an external scene side and including a reflective diffraction grating that is at least partially reflective to image light incident through the eye-ward side of the diffractive optical combiner and at least partially transmissive to external scene light incident through the external scene side of the diffractive optical combiner, wherein the diffractive optical combiner is an off-axis planar diffractive optical combiner;
   one or more refractive correction lenses disposed in an optical path of the image light prior to being incident upon the eye-ward side of the diffractive optical combiner to aid in pre-correcting aberrations induced in the image light after reflection off of the diffractive optical combiner, wherein the one or more refractive correction lenses offset astigmatism induced by reflection mode diffraction from the off-axis planar diffractive optical combiner; and
   a diffractive correction element disposed in the optical path of the image light prior to being incident upon the eye-ward side of the diffractive optical combiner to pre-compensate for lateral color aberrations induced in the image light after reflection off of the diffractive optical combiner.

2. The optical apparatus of claim 1, wherein the pre-compensation induced by the diffractive correction lens is a transmission mode diffraction that is complementary to a reflection mode diffraction of the diffractive optical combiner to reduce lateral color aberration in the image light received at an eyebox of the optical apparatus due to a finite linewidth in the image light.

3. The optical apparatus of claim 2, further comprising:
   a non-laser image source positioned to emit the image light along the optical path extending through the refractive correction lens and the diffraction correction element, wherein the non-laser image source generate the image light with a line width of greater than 10 nm.

4. The optical apparatus of claim 3, wherein the non-laser image source includes a light emitting diode ("LED") lamp source.

5. The optical apparatus of claim 3, wherein the refractive correction lenses comprise:
   an aspherical correction lens; and
   a spherical correction lens.

6. The optical apparatus of claim 5, wherein the aspherical correction lens is rotationally symmetrical.

7. The optical apparatus of claim 5, wherein the spherical correction lens is a first curved surface formed into a first side of a unitary lens body and the aspherical correction lens is a second curved surface formed into a second side of the unitary lens body opposite the first side.

8. The optical apparatus of claim 7, wherein the unitary lens body comprises injection molded plastic.

9. The optical apparatus of claim 2, wherein the one or more refractive correction lenses and the diffractive correction element are disposed off-axis from the diffractive optical combiner such that the optical path of the image light incident upon the eye-ward side of the diffractive optical combiner forms an oblique angle with a normal vector of the eye-ward side.

10. The optical apparatus of claim 2, wherein the eye-ward side and the external scene side of the diffractive optical combiner are flat, planar surfaces that are parallel to each other.

11. The optical apparatus of claim 2, wherein the diffractive correction element is disposed on a surface of one of the refractive correction lenses.

12. The optical apparatus of claim 2, wherein the diffractive correction element and the refractive correction lenses are integrated into a unitary hybrid diffractive-refractive element.

13. The optical apparatus of claim 2, wherein the one or more refractive correction lenses pre-compensate for astigmatism induced in the image light by the diffractive optical combiner.

14. The optical apparatus of claim 2, wherein the diffractive optical combiner further comprises:
   a base sandwich layer having a first index of refraction and including a first side facing the eye-ward side;
   a two-dimensional ("2D") array of three-dimensional ("3D") diffraction element shapes disposed in the first side of the base sandwich layer;
   partially reflective elements each coating one of the 3D diffraction element shapes and conforming thereto, wherein the partially reflective elements collectively form the reflective diffraction grating having magnifying optical power for the image light incident through the eye-ward side of the diffractive optical combiner; and a planarization sandwich layer disposed over the partially reflective elements having a second index of refraction substantially equal to the first index of refraction of the base sandwich layer such that external scene light incident through the external scene side passes through the diffractive optical combiner substantially without diffraction while the image light incident through the eye-ward side is reflected and magnified via the reflective diffraction grating.

15. The optical apparatus of claim 14, wherein the reflective diffraction grating comprises an off-axis diffractive lens that receives the image light incident upon the eye-ward side at a first angle and reflects the image light along a reflection path having a second angle, wherein the first angle is more oblique relative to a normal of an emission surface of the planarization sandwich layer than the second angle.

16. A head mountable display ("HWD") for combing image light with external scene light, the HMD comprising:
    an image source to generate the image light;
    a diffractive optical combiner having an eye-ward side and an external scene side and including a reflective diffraction grating that is at least partially reflective to the image light incident through the eye-ward side of the diffractive optical combiner and at least partially transmissive to the external scene light incident through the external scene side of the diffractive optical combiner, wherein the diffractive optical combiner is an off-axis planar diffractive optical combiner;
    one or more refractive correction lenses disposed in an optical path of the image light between the image source and the eye-ward side to aid in pre-correcting aberrations induced in the image light after reflection off of the diffractive optical combiner, wherein the one or more refractive correction lenses offset astigmatism induced by reflection mode diffraction from the off-axis planar diffractive optical combiner;
    a diffractive correction element disposed in the optical path between the image source and the eye-ward side to pre-compensate for lateral color aberrations induced in the image light after reflection off of the diffractive optical combiner; and
    a frame assembly to support the image source, the diffractive optical combiner, the refractive correction lenses, and the diffractive correction element for wearing on a head of a user with the diffractive optical combiner positioned in front of an eye of the user.

17. The HMD of claim 16, wherein the pre-compensation induced by the diffractive correction element is a transmission mode dispersion that is complementary to a reflection mode dispersion of the diffractive optical combiner to reduce lateral color aberrations of the image light received at an eyebox of the optical apparatus caused by a range of wavelengths emitted by the image source.

18. The HMD of claim 17, wherein the image source includes a light emitting diode ("LED") lamp source that generates light with a linewidth of greater than 10 nm.

19. The HMD of claim 17, wherein the refractive diffraction lenses comprise:
    an aspherical correction lens that is rotationally symmetric; and
    a spherical correction lens disposed between the aspherical correction lens and the image source.

20. The HMD of claim 19, wherein the spherical correction lens is a first curved surface formed into a first side of a unitary lens body and the aspherical correction lens is a second curved surface formed into a second side of the unitary lens body opposite the first side.

21. The HMD of claim 17, wherein the one or more refractive correction lenses and the diffractive correction element are disposed off-axis from the diffractive optical combiner such that the optical path of the image light incident upon the eye-ward side of the diffractive optical combiner forms an oblique angle with a normal vector of the eye-ward side.

22. The HMD of claim 17, wherein the eye-ward side and the external scene side of the diffractive optical combiner are flat, planar surfaces that are parallel to each other.

23. The HMD of claim 17, wherein the one or more refractive correction lenses balance astigmatism induced in the image light by the diffractive optical combiner.

24. The HMD of claim 17, wherein the diffractive optical combiner further comprises:
    a base sandwich layer having a first index of refraction and including a first side facing the eye-ward side;
    a two-dimensional ("2D") array of three-dimensional ("3D") diffraction element shapes disposed in the first side of the base sandwich layer;
    partially reflective elements each coating one of the 3D diffraction element shapes and conforming thereto, wherein the partially reflective elements collectively form the reflective diffraction grating having magnifying optical power for the image light incident through the eye-ward side of the diffractive optical combiner; and
    a planarization sandwich layer disposed over the partially reflective elements having a second index of refraction substantially equal to the first index of refraction of the base sandwich layer such that external scene light incident through the external scene side passes through the diffractive optical combiner substantially without diffraction while the image light incident through the eye-ward side is reflected and magnified via the reflective diffraction grating.

25. The HMD of claim 24, wherein the reflective diffraction grating comprises an off-axis diffractive lens that receives the image light incident upon the eye-ward side at a first angle and reflects the image light along a reflection path having a second angle, wherein the first angle is different than the second angle as measured from a normal of an emission surface of the planarization sandwich layer.

* * * * *